United States Patent [19]

Bauer

[11] 4,245,266
[45] Jan. 13, 1981

[54] ARRANGEMENT FOR AUTOMATICALLY LOADING A FLOPPY DISC INTO A FLOPPY DISC DRIVE UNIT

[75] Inventor: Paul Bauer, Ergolding, Fed. Rep. of Germany

[73] Assignee: Siemens Aktiengesellschaft, Berlin & Munich, Fed. Rep. of Germany

[21] Appl. No.: 19,071

[22] Filed: Mar. 9, 1979

[30] Foreign Application Priority Data

Mar. 22, 1978 [DE] Fed. Rep. of Germany ....... 2812637

[51] Int. Cl.³ .................... G11B 5/016; G11B 17/04
[52] U.S. Cl. ..................................................... 360/99
[58] Field of Search ............................ 360/99, 98, 97

[56] References Cited

U.S. PATENT DOCUMENTS

| | | | |
|---|---|---|---|
| 3,678,481 | 7/1972 | Dalziel et al. | 360/99 |
| 3,768,815 | 10/1973 | Mathurin | 274/40 |
| 3,890,643 | 6/1975 | Dalziel | 360/99 |
| 4,127,882 | 11/1978 | Kohl et al. | 360/98 |

Primary Examiner—Robert S. Tupper
Attorney, Agent, or Firm—Hill, Van Santen, Steadman, Chiara & Simpson

[57] ABSTRACT

The invention relates to an arrangement for automatically loading a floppy disc into a floppy disc drive unit, using a positioning motor that locates a magnetic head on various tracks on the floppy disc. After the floppy disc has been partly inserted in the floppy disc drive unit, the floppy disc is grasped by a gripping element disposed on a slide. The positioning motor moves the slide at the same time as the magnetic head so that the floppy disc is drawn into the floppy disc drive unit. Then the slide is locked. To eject the floppy disc, the lock is released and, guided by the positioning motor, the slide, together with the floppy disc, is partially ejected from the floppy disc drive unit.

7 Claims, 3 Drawing Figures

ARRANGEMENT FOR AUTOMATICALLY LOADING A FLOPPY DISC INTO A FLOPPY DISC DRIVE UNIT

BACKGROUND OF THE INVENTION

1. Field of the Invention

The invention concerns an arrangement for automatically loading a floppy disc into a floppy disc drive unit.

2. Description of the Prior Art

A floppy disc drive unit is known from U.S. Pat. No. 3,768,815 (fully incorporated herein by this reference) in which the floppy disc is pushed in by hand. Before insertion, the lid of the floppy disc drive unit is raised. Then the floppy disc is pushed in and the lid is closed again. Simultaneously with the closure of the lid a clamping device is operated which centers the floppy disc and through which the floppy disc is driven. A similar floppy disc drive unit is known from U.S. Pat. No. 3,678,481 (fully incorporated herein by this reference). If, with these known floppy disc drive units, the floppy disc is inserted incorrectly, the result may be damage to the floppy disc. For example, the floppy disc is damaged if it has not been inserted completely and the clamping device is operated or the lid closed.

SUMMARY OF THE INVENTION

Consequently, the underlying object of the invention is to provide an arrangement which allows the floppy disc to be loaded into a floppy disc drive unit automatically.

According to the invention, the above object is achieved with the arrangement of the kind generally set forth above in that a gripping arrangement grasping the floppy disc draws the floppy disc into the floppy disc drive unit using a motor.

An arrangement constructed in accordance with the invention has the advantage that damage to the floppy disc during insertion is avoided. The floppy disc is protected against unintentional extraction without even using a locking lid. The arrangement allows the floppy disc drive unit to be made slim because the area in which the clamping device and the lid swing is no longer needed. Moreover, by virtue of the automatic loading of the floppy disc, the floppy disc drive unit is suited for use in conjunction with a stack feeder.

If the floppy disc drive unit has a positioning motor for a magnetic head, the arrangement becomes particularly inexpensive if the positioning motor is used to draw the floppy disc into the drive unit.

One particularly preferred and advantageous embodiment of the arrangement is characterized in that during loading of the floppy disc, the gripping arrangement is detachably linked to the head carrier and can be moved together with the latter by the positioning motor. In particular, it is advantageous if provision is made for a tension spring for pressing the gripping arrangement against the head carrier in the opposite direction to that of loading and an element is provided for locking the gripping arrangement once the floppy disc has been drawn in. In this case, there is no need for any interlock between the gripping arrangement and the head carrier.

In order to be able to make full use of the positioning range of the magnetic head, it is expedient if the locking element locks the gripping arrangement after the casing has been moved beyond its working position.

The gripping arrangement is locked in a simple manner if the locking element locks the gripping arrangement while the floppy disc is being clamped.

The floppy disc is also ejected from the floppy disc drive unit automatically when the gripping arrangement, using the motor, pushes the floppy disc out of its working position at least partly out of the floppy disc drive unit. A favorable design for the arrangement is obtained if the gripping arrangement is provided in the form of a slide equipped with gripping elements.

The arrangement functions reliably if the gripping elements are sprung and hold the corners of the part of the casing of the floppy disc pushed into the floppy disc drive unit.

In order to increase the friction between the gripping elements and the casing of the floppy disc, it is expedient if the inner surfaces of the gripping elements are lined with felt.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENT

Figure 1:
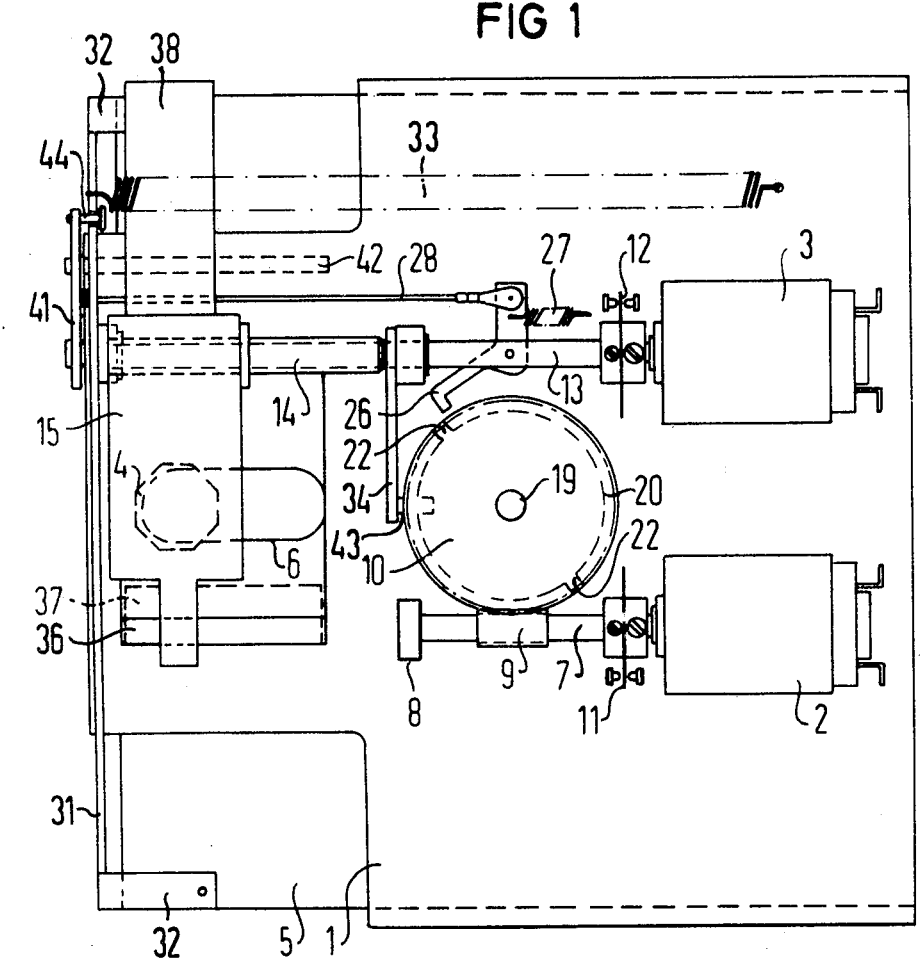
FIG. 1 is a plan view of a floppy disc drive unit employing the present invention.

In the floppy disc drive unit shown in FIG. 1 the underside of a base plate 1 carries a DC servo motor serving as driving motor 2 for a floppy disc 5. In a manner known per se the floppy disc 5 consists of a flexible magnetic disc in a square casing. Both the magnetic disc and the casing exhibit central openings into which a clamping device engages, centering and driving the magnetic disc. In addition, the casing exhibits an aperture 6 through which a magnetic head 4 comes into contact with the magentic disc. In addition to driving the magnetic disc, the driving motor 2 is also used for automatic clamping and unclamping of the magnetic disc.

Another DC servo motor serving as a positioning motor 3 for the magnetic head 4 is disposed parallel with the driving motor 2. The positioning motor 3 also serves for automatic loading and ejection of the floppy disc 5.

A shaft 7 on the driving motor 2 is disposed at right angles to a shaft 19 in the clamping device. The shaft 7 is mounted in a ball bearing race 8 outside the driving motor 2. A worm 9 which drives a whee' 10 connected to the clamping device is disposed on the shaft 7.

When particularly stringent requirements are made regarding the elimination of play in the drive, the worm 9 can be pressed into mesh with the wheel 10. This can be achieved in that the driving motor 2 is mounted pivotable in a plane parallel with the base plate 1 and a spring force is exerted through the ball bearing 8 on shaft 7 which presses the worm 9 against the wheel 10. The wheel 10 can also be pitched in a manner known per se in order to eliminate play in the worm device.

To make the magnetic disc rotate at a constant speed, the driving motor 2 is regulated. A perforate disc 11 is disposed on shaft 7 and allows digital control of the speed of the driving motor 2 when combined with photocells. The positioning motor 3 is designed in the manner as driving motor 2 and is also fitted with a perforeate disc 12 and associated photocells.

A shaft 13 on the positioning motor 3 is partly constituted by a spindle 14 with whose aid the magnetic head 4 fixed on a head carrier 15 is displaceable within the aperture 6 in the radial direction of the magnetic disc. With the aid of the positioning motor 3 the magnetic head 4 is positioned on different tracks on the magnetic disc.

The floppy disc 5 is drawn into the floppy disc drive unit and ejected from it with the aid of a gripping arrangement. The gripping arrangement is formed by a slide 31 equipped with two gripping elements 32 for the floppy disc 5. Loading and ejection can be effected with the aid of another motor or, as in the present exemplary embodiment, with the assistance of the positioning motor 3.

To load the floppy disc 5 with the aid of the positioning motor 3, the head carrier 15 on spindle 14 is moved to the center. The slide 31 is pressed against the head carrier 15 through the pull of a tension spring 33. In the area of its rear corners the floppy disc 5 is pressed into the gripping elements 32 by hand. The gripping elements 32 are sprung and their insides are covered with a friction lining, such as felt for example. Controlled by a signal given by a photocell or a switch, the positioning motor 3 is switched on and the head carrier 15 is moved along spindle 14 away from the middle with the aid of the positioning motor 3. In the process it is guided by two guide rods 35 and 36. The slide 31 is moved with the head carrier 15 and the floppy disc 5 grasped by the gripping elements 32 is drawn into the floppy disc drive unit.

The floppy disc 5 is drawn in beyond the working position shown in FIG. 1 by an additional amount which, for example, corresponds to the width of three tracks on the magnetic disc, into an end position. When the slide 31 has reached the end position, the positioning motor 3 is switched off by a stop contact. During the additional movement, a lever 26 is operated through a stop flange on an actuating rod 28 and preparation for automatically clamping the magentic disc in the clamping device is made.

Further details are described in the following in conjunction with the sectional view shown in FIG. 2.

Figure 2:
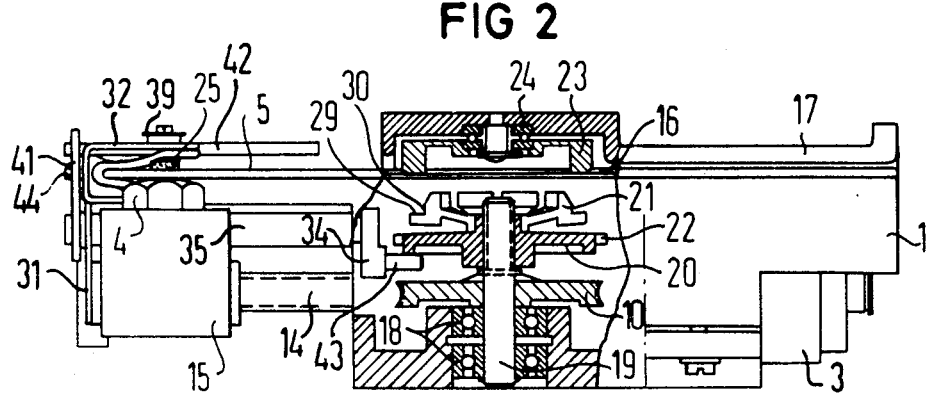
FIG. 2 is a sectional view taken through a portion of FIG. 1.

In the sectional view shown in FIG. 2 the floppy disc 5 is inserted between the base plate 1 and a cover plate 17. The clamping device is constituted by a pot-shaped centering sleeve 23 and a spreader arrangement. The centering sleeve 23 is mounted in a ball bearing 24 in the cover plate 17. The spreader arrangement consists of a disc 20 provided with protrusions 22 and of a spreader crown 21. The clamping device is rotatably mounted by means of the shaft 19 which is mounted in two ball bearings 18. The upper part of shaft 19 is threaded and the spreader arrangement is disposed on this so as to be screwable axially.

When the slide 31 has reached its end position and the positioning motor 3 is switched off, the driving motor 2 is switched on. The driving motor 2 drives shaft 19 through the worm drive formed by worm 9 and wheel 10. After operating the actuating rod 28, the lever 26 engages with one of the protrusions 22 on the disc 20 and prevents the spreader arrangement from turning. Since the upper part of shaft 19 is threaded, the spreader arrangement is screwed upwardly. The spreader crown 21 is screwed into the central opening in the magnetic disc 16 until this is firmly clamped in the axial direction between the edges 29 and the centering sleeve 23. The spreader crown 21 is so formed that its spokes form an acute angle with the radial plane of the shaft 19. As a result the edges 30 of the spreader crown 21 are pressed outwardly as the latter is screwed into the centering sleeve 23 and the magnetic disc 16 is centered while it is being clamped.

While the magnetic disc 16 is being clamped, the slide 31 is locked and a felt pressure pad 25 opposite the magnetic head is lowered onto the magnetic disc 16. In addition another felt pressure pad 37 is lowered onto the floppy disc 5. These operations are described in the following in conjunction with the sectional view shown in FIG. 3.

Figure 3:
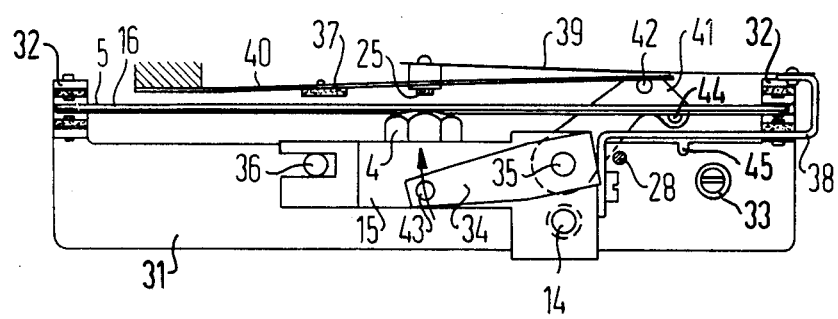
FIG. 3 is another sectional view taken through another portion of FIG. 1.

In the sectional view through a portion of the floppy disc drive unit level with the magnetic head 4 shown in FIG. 3, the head carrier 15 moved by the spindle 14 is shown, this being guided by the guide rods 35 and 36. Behind the head carrier is shown the slide 31 with the gripping elements 32 which is also guided on the guide rods 35 and 36. The head carrier 15 has a bracket 38 fixed to it at whose other end, on the top side of the floppy disc 5, a leaf spring 39 fitted with felt pressure pad 25 is fixed. The other felt pressure pad 37 is fixed to a sprung bracket 40 secured to the chassis. Before the floppy disc 5 is pushed in, the springs 39 and 40 for the felt pressure pads 25 and 37 are held in the raised position shown by a pin 42 fixed to a lever 41. The lever 41 is linked by means of guide rod 35 to a lever 34. The lever 34 is provided with a pin 43 that is pressed against the underside of the disc 20 by the force of the leaf spring 39. In addition, the lever 41 has a bolt 44 fixed to it which works with a slot 45 in the slide 31.

When the floppy disc is clamped, as the disc 20 is moved upwardly, the lever 34 and the lever 41 are turned clockwise about guide rod 35. At the same time the leaf spring 39 resting on pin 42 and the bracket 40 are lowered so that the felt pressure pads 25 and 37 are placed on the magnetic disc 16 and the floppy disc 5, respectively. In addition, the shank of the bolt 44 engages in the slot 45. The bolt 44 has a head whose diameter is greater than the size of the slot 45 and the slide 31 is thereby locked in its end position.

After the magnetic disc 16 has been clamped, the felt pressure pads 25 and 37 have been lowered and the slide 31 has been simultaneously locked, the driving motor 2 is switched off. This can be effected, for example, by measuring the current through the driving motor 2 and turning driving motor 2 off when the current exceeds a present magnitude. Then, the positioning motor 3 is turned on to move the floppy disc 5 back into working position over the additional distance travelled from the center. The slide 31 follows, moving an amount which is less than the initial additional amount and corresponds, for example, to the width of two tracks. The actuating rod 28 is not operated any further and lever 26 adopts its resting position under the influence of a tension spring 27. The spreader arrangement is no longer prevented from turning and when driving motor 2 has been switched on, the magnetic disc 16 is driven through the clamping device. Then, the positioning motor 3 can locate the magnetic head 4 on the desired tracks of magnetic disc 16. Since the slide 31 has been locked using the bolt 44, slide 31 is not moved while the magnetic head 4 is being positioned and the floppy disc 5 remains in its working position.

To unclamp the magnetic disc 16, the head carrier 15 pushes slide 31 back into its end position away from the middle. In the process actuating rod 28 is operated and the lever 26 engages with one of the protrusions 22 on the disc 20. The driving motor 2 is operated in the reverse direction of rotation and the spreader arrangement is screwed out of the centering sleeve and the central aperture in the magnetic disc 16 in the opposite direction to that of clamping and is moved downwardly.

As pin 43 bears on the underside of disc 20, the levers 34 and 41 are simultaneously turned around the guide rod 35 in an counter-clockwise direction. Because of the pin 42, the leaf spring 39 and the bracket 40 are raised again. In addition, the bolt 44 no longer engages in the slot 45 and the slide 31 is unlocked.

When the lever 34 meets a lower stop contact, the driving motor 2 is switched off. Then, the positioning motor 3 moves the head carrier 15 to the middle through the spindle 14. And this movement is also followed by the slide 31 under the action of the pull of the tension spring 33. Then, the positioning motor 3 is switched off. The floppy disc 5 projects out of the floppy disc drive unit by the amount the slide 31 is moved, and can be withdrawn.

Although I have described my invention by reference to a particular illustrative embodiment, many changes and modifications thereof may become apparent to those skilled in the art without departing from the spirit and scope of the invention. I therefore intend to include within the patent warranted hereon all such changes and modifications as may reasonably and properly be included within the scope of my contribution to the art.

I claim:

1. A floppy disc drive unit including device for automatically loading a floppy disc, said device comprising:
   a gripping arrangement movably mounted in said drive unit for gripping and moving a floppy disc between a loading/unloading position and a transducing position;
   a magnetic head carrier with a magnetic head mounted thereon;
   a positioning motor operatively coupled to said magnetic head carrier for moving said carrier in first and second directions to position said magnetic head on various tracks on the disc, said directions being the directions of loading and unloading, respectively, of the floppy disc; and
   connecting means releasably coupling said head carrier to said gripping arrangement so that operation of said positioning motor causes movement of said gripping arrangement.

2. The invention of claim 1, wherein:
   a magnetic head carrier connects said magnetic head to said motor,
   said connecting means includes releasable engagement means for coupling said gripping means to said head carrier.

3. The invention of claim 1, wherein said releasable engagement means comprises:
   a spring connected to said gripping means for urging said gripping arrangement against said head carrier; and
   latching means for releasably latching said gripping means and said head carrier.

4. The invention of claim 3, wherein said latching means comprises:
   means defining a slot in said gripping means; and
   a spring-biased lever carrying a bolt having a head, said lever mechanism operable to insert said bolt in said slot with said head carrying said gripping means.

5. The invention of claim 4, wherein said gripping means comprises:
   the slide mounted for movement in the loading direction and in the unloading direction; and
   gripping elements carried spaced apart on said slide.

6. The invention of claim 5, wherein:
   said gripping elements are spaced to grasp corner portions of a floppy disc and include spring members.

7. The invention of claim 6, wherein:
   said spring members have inner surface and said gripping elements include felt liners carried on said inner surfaces.

* * * * *